United States Patent
Broach et al.

(10) Patent No.: US 7,822,165 B2
(45) Date of Patent: Oct. 26, 2010

(54) NUCLEAR FUEL ASSEMBLY DEBRIS FILTER BOTTOM NOZZLE

(75) Inventors: Kirkland D. Broach, Lexington, SC (US); Carter E. Lunde, Columbia, SC (US); Phillip L. Hazlett, Columbia, SC (US)

(73) Assignee: Westinghouse Electric Co LLC, Cranberry Township, PA (US)

( * ) Notice: Subject to any disclaimer, the term of this patent is extended or adjusted under 35 U.S.C. 154(b) by 1152 days.

(21) Appl. No.: 10/751,349

(22) Filed: Jan. 5, 2004

(65) Prior Publication Data
US 2005/0157836 A1    Jul. 21, 2005

(51) Int. Cl.
G21C 15/00    (2006.01)
G21C 19/28    (2006.01)

(52) U.S. Cl. ...................... 376/362; 376/352
(58) Field of Classification Search .................. 376/352, 376/313, 362
See application file for complete search history.

(56) References Cited

U.S. PATENT DOCUMENTS

| | | | |
|---|---|---|---|
| 3,840,051 A * | 10/1974 | Akashi et al. ................ 138/37 |
| 4,118,973 A * | 10/1978 | Tucker et al. .............. 73/54.07 |
| 4,652,425 A | 3/1987 | Ferrari et al. |
| 4,664,880 A | 5/1987 | Bryan |
| 4,678,627 A | 7/1987 | Rylatt |
| 4,684,495 A | 8/1987 | Wilson et al. |
| 4,684,496 A | 8/1987 | Wilson et al. |
| 4,832,905 A | 5/1989 | Bryan et al. |
| 4,900,507 A * | 2/1990 | Shallenberger et al. ..... 376/352 |
| 4,997,621 A * | 3/1991 | Johansson et al. ........... 376/444 |
| 5,009,839 A * | 4/1991 | King .......................... 376/352 |
| 5,024,806 A * | 6/1991 | Cioffi et al. ................. 376/352 |
| 5,030,412 A | 7/1991 | Yates et al. |
| 5,071,617 A * | 12/1991 | Bryan et al. ................ 376/352 |
| 5,094,802 A * | 3/1992 | Riordan, III ................ 376/352 |
| 5,100,611 A | 3/1992 | Nylund |
| 5,154,879 A * | 10/1992 | Grattier ...................... 376/352 |
| 5,167,909 A | 12/1992 | Leroux |
| 5,438,598 A * | 8/1995 | Attix .......................... 376/352 |
| 5,473,650 A * | 12/1995 | Johansson ................... 376/313 |
| 5,488,634 A * | 1/1996 | Johansson et al. .......... 376/313 |
| 5,519,745 A * | 5/1996 | Proebstle et al. ........... 376/313 |
| 5,528,640 A * | 6/1996 | Johansson et al. .......... 376/313 |
| 5,748,694 A * | 5/1998 | King .......................... 376/313 |
| 6,608,880 B2 * | 8/2003 | Smith et al. ................. 376/352 |

FOREIGN PATENT DOCUMENTS

EP    205162 A2 *  12/1986

OTHER PUBLICATIONS

Kreith, F. et.al, Section 3 "Fluid Mechanics" Mechanical Engineering Handbook, Boca Raton; CRC Press LLC, 1999, p. 3-190 "Venturis".*

(Continued)

*Primary Examiner*—Ella Colbert
*Assistant Examiner*—Daniel L Greene, Jr.

(57) ABSTRACT

A debris filter bottom nozzle for a nuclear fuel assembly having a support skirt and a top plate. The top nozzle plate has defined therethrough a plurality of flow holes. The axial bore through each flow hole is contoured as a venture. Preferably, the venturi is formed with a double chamfered inlet.

16 Claims, 3 Drawing Sheets

OTHER PUBLICATIONS

W. Bussman, Ph.D, et al. Section 3 "Fluid Flow" Industrial Burners Handbook, CRC Press LLC, 2003, Figure 3.3 and section 3.3.3 Eduction Processes.*

Section 3 "Liquids in Motion" Mechanical Engineers' Handbook, Sixth Edition, McGraw-Hill Book Company, Inc. 1958, pp. 3-59 through 3-65.*

Sherif, S.A. Section 42 "Fluid Measurements" The Engineering Handbook, Boca Raton; CRC Press LLC, 2000, Figure 42.6 "Venturi tube.".*

M. Mitchell "Animated Demonstration of Bernoulli's Principle" 2003, available @ http://home.earthlink.net/~mmc1919/venturi.html.*

M. Mitchell "Bernoulli's Principle Introductory Discussion" 2003, available @ http://home.earthlink.net/~mmc1919/venturi.discuss.nomath.html.*

M. Mitchell "Bernoulli's Principle Advanced Discussion" 2003, available @ http://home.earthlink.net/~mmc1919/venturi.discuss.math.html.* definitions of "bevel" (p. 109), "chamfer" (p. 189), "discrete" (p. 331), "distinct" (p. 337), "plurality" (p. 894), "series" (p. 1066), Merriam-Webster's Collegiate Dictionary Tenth Edition, Copyright (c) 2001.*

* cited by examiner

NUCLEAR FUEL ASSEMBLY DEBRIS FILTER BOTTOM NOZZLE

BACKGROUND OF THE INVENTION

1. Field of the Invention

The present invention relates generally to nuclear reactors and, more particularly, is concerned with a debris filter bottom nozzle for a nuclear fuel assembly.

2. Related Art

During manufacturing, subsequent installation and repair of components comprising a nuclear reactor coolant circulation system, diligent effort is made to help assure removal of all debris from the reactor vessel and its associated systems, which circulate coolant throughout the primary reactor coolant loop under various operating conditions. Although elaborate procedures are carried out to help assure debris removal, experience shows that in spite of the safeguards used to effect such removal, some chips and metal particles still remain hidden in the systems. Most of the debris consists of metal turnings, which were probably left in the primary system after steam generator repair or replacement.

In particular, fuel assembly damage due to debris trapped at the lowermost grid has been noted in several reactors in recent years. Debris enters through the fuel assembly bottom nozzle flow holes from the coolant flow openings in the lower core support plate when the plant is started up. The debris tends to become lodged in the lowermost support grid of the fuel assembly within the spaces between the "egg crate" shaped cell walls of the grid and the lower end portions of the fuel rod tubes. The damage consists of fuel rod tube perforations caused by fretting of the debris in contact with the exterior of the tube. Debris also becomes entangled in the nozzle plate holes and the flowing coolant causes the debris to gyrate, which tends to cut through the cladding of the fuel rods.

Several different approaches have been proposed and tried for carrying out the removal of debris from nuclear reactors. Many of these approaches are discussed in U.S. Pat. No. 4,096,032 to Mayers et al. Others are illustrated and described in the various patents cross-referenced, in U.S. Pat. No. 4,900,507, assigned to the instant assignee. While all of the approaches described in the cited patent and cross references operate reasonably well and generally achieve their objectives under the range of operating conditions for which they were designed, a need still exists for a further improved approach to the problem of debris filtering in nuclear reactors, to address an improved reduction in pressure drop across the bottom nozzle that is required for more advanced fuel designs currently going under development.

SUMMARY OF THE INVENTION

The present invention provides a debris filter bottom nozzle in a fuel assembly designed to satisfy the aforementioned needs. The bottom nozzle of the present invention includes a nozzle plate employing the concept of having flow holes smaller in diameter than have been otherwise used prior to that disclosed in U.S. Pat. No. 4,900,507, with a further improved reduction in pressure drop across the nozzle plate. The flow holes are preferably about 0.190 inch (0.48 cm) in diameter at their narrowest constriction, which makes them sized to filter out debris of damage-inducing size which otherwise collects primarily in the sections between the bottom nozzle and the lowermost grid and in the unoccupied spaces of the lowermost grid and causes fuel rod fretting failures. As noted in U.S. Pat. No. 4,900,507 ('507 patent), unexpectedly, this concept reduces pressure drop of the debris filter bottom nozzle as compared to the prior art bottom nozzle, although the total flow area through the bottom nozzle with this design is less than the total flow area through the prior art bottom nozzle. Significantly greater flow area is provided by the debris filter bottom nozzle pattern of smaller flow holes than by the prior art bottom nozzle pattern of larger flow holes in the local areas of the respective nozzle plates directly above the coolant inlet flow holes in the reactor lower core plate.

One embodiment of this invention provides a venturi contour to the flow holes to further reduce the pressure drop across the bottom nozzle plate. A second embodiment further enhances the manufacturability of this invention by creating the venturi contour by chamfering either only the inlet or both the inlet and outlet of the flowthrough holes in the bottom nozzle plate.

In the preferred embodiment, the inlet through the flowthrough hole is provided with a double chamfer, with the angles between the double chamfer optimized to provide the lowest pressure drop. The double chamfer approximates a radius, i.e., a curve, without the attendant expense and difficulties of machining a curved surface, which streamlines the flow through the holes.

Accordingly, the present invention is directed to a debris filter bottom nozzle useful in a fuel assembly for a nuclear reactor wherein the fuel assembly includes a plurality of nuclear fuel rods, at least a lowermost grid supporting the fuel rods in an organized array and having unoccupied spaces defined therein allowing flow of fluid coolant therethrough. The debris filter bottom nozzle is disposed adjacent to and below the grid and below lower ends of the fuel rods. The bottom nozzle comprises a nozzle plate fixed on support means facing towards a lowermost grid and having defined therethrough a plurality of flow apertures individually sized so that most debris larger in size than the maximum dimension of the unoccupied spaces through the lowermost grid are captured below, within or proximate the aperture outlet orifice. In this way most of the debris being carried by the liquid coolant through the nozzle plate is small enough to pass through the unoccupied grid spaces, whereas most debris being carried by the liquid coolant which is large enough to not pass through the unoccupied grid spaces and collect in the grid, will not pass through the flow apertures or will be retained proximate the outlets of the flow apertures. A reduction in pressure drop across the bottom nozzle plate is achieved by establishing a venturi contour in the flowthrough holes. Further enhancement of the manufacturability and inspectability of the design of this invention is established by providing a chamfer on the outlet side of the flowthrough holes and preferably a double chamfer on the inlet side. Where some reduction in pressure drop is desirable over that achieved in the '507 patent, but the amount of reduction is not critical a further manufacturing cost savings can be achieved by eliminating the outlet chamfer.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
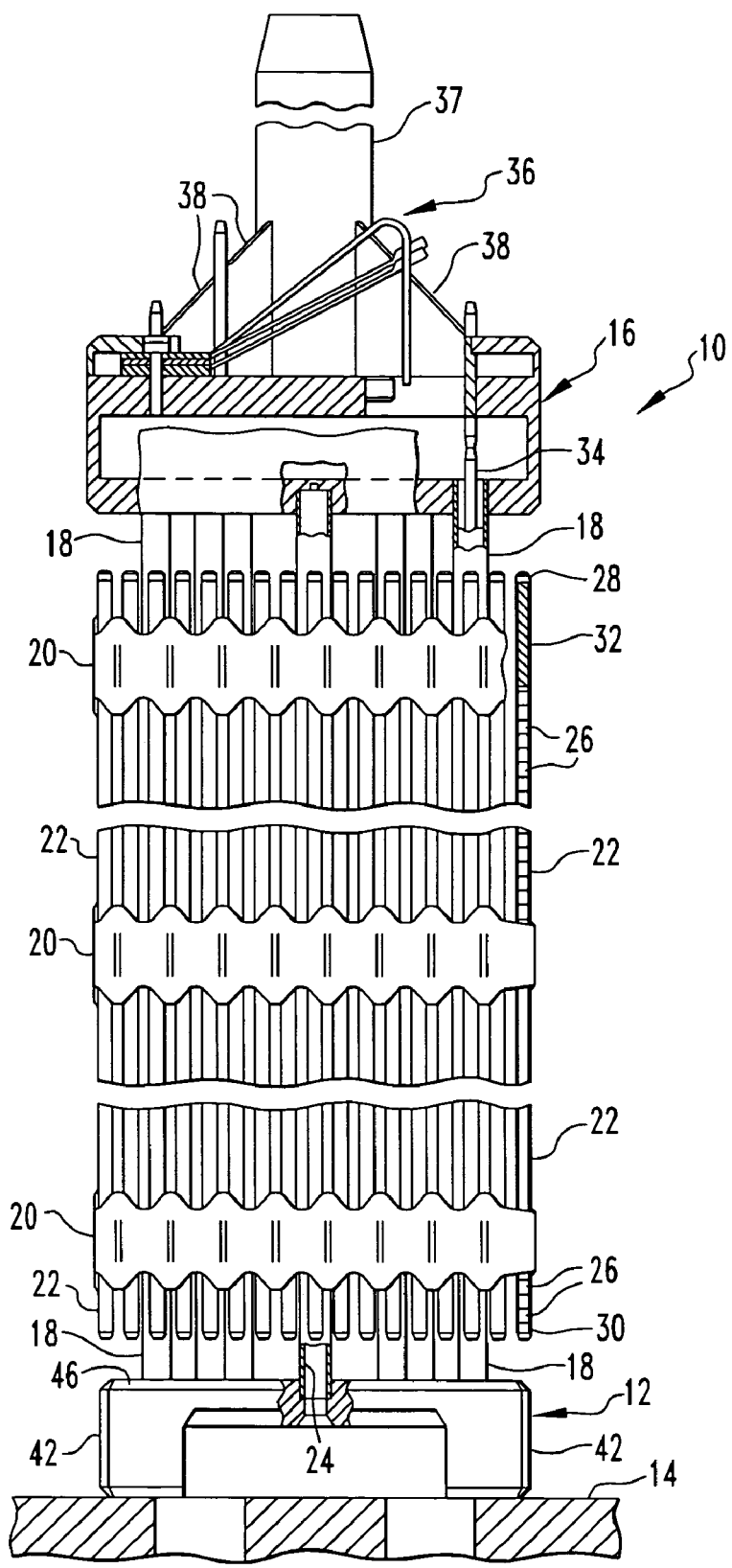
FIG. 1 is an elevational view, partially in section, of a fuel assembly in which is incorporated the preferred embodiment of the debris trap of the present invention, the assembly being illustrated in vertically shortened form, with parts broken away for clarity.

In the following description, like reference characters designate like or corresponding parts throughout the several views of the drawings. Also in the following description, it is to be understood that such terms as "forward", "rearward", "left", "right", "upwardly", "downwardly" and the like are words of convenience and are not to be construed as limiting terms.

Fuel Assembly

Referring now to the drawings and particularly to FIG. 1, there is shown an elevational view of the fuel assembly, represented in vertically shortened form and being generally designated by reference numeral 10. The fuel assembly 10 is the type used in a pressurized water reactor and has a structural skeleton which, at its lower end, includes the debris filter bottom nozzle 12 of the present invention (which will be described later in detail). The bottom nozzle 12 supports the fuel assembly 10 on a lower core support plate 14 in the core region of the nuclear reactor (not shown). In addition to the bottom nozzle 12, the structural skeleton of the fuel assembly 10 also includes a top nozzle 16 at its upper end and a number of guide tubes or thimbles 18, which extend longitudinally between the bottom and top nozzles 12 and 16 and at opposite ends are rigidly attached thereto.

The fuel assembly 10 further includes a plurality of traverse grids 20 axially-spaced along, and mounted to, the grid thimble tubes 18 and an organized array of elongated fuel rods 22 traversely-spaced and supported by the grids 20. Also, the assembly 10 has an instrumentation tube 24 located in the center thereof and extending between, and mounted to, the bottom and top nozzles 12 and 16. With such an arrangement of parts, fuel assembly 10 forms an integral unit capable of being conveniently handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly in order to extract heat generated therein for the production of useful work.

To control the fission process, a number of control rods 34 are reciprocally moveable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially-extending flukes or arms 38. Each arm 38 is interconnected to control rod 34 such that the control rod mechanism 36 is operable to move the control rods vertically in the guide thimbles 18 to thereby control the fission process in the fuel assembly 10, all in a well known manner.

Debris Filter Bottom Nozzle

As mentioned above, fuel assembly damage due to debris trapped at or below the lowermost one of the grids 20 supporting the fuel bearing regions of the fuel rods has been found to be a problem. Therefore, to prevent occurrence of such damage, it is highly desirable to minimize the debris that passes through the bottom nozzle flow holes or the interfaces between the outlets of the bottom nozzle flow holes and the adjoining structures.

Figure 2:
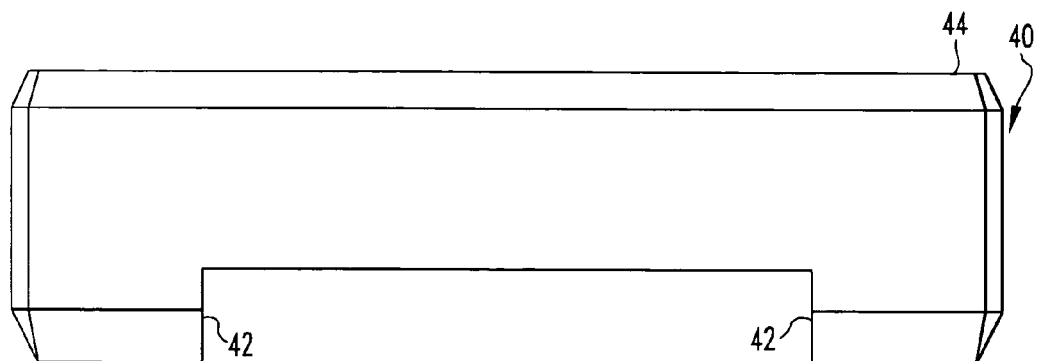
FIG. 2 is a side view of a bottom nozzle support skirt of this invention.

The present invention relates to a bottom nozzle 12 which, in addition to supporting the fuel assembly 10 on the lower core plate 14, also contains features which function to filter out potentially damaging size debris from the coolant flow passed upwardly through the bottom nozzle with a a reduction in pressure drop over that experienced in the design of the '507 patent. The bottom nozzle 12 includes support means, for example the skirt 40 shown in FIG. 2. The support means, skirt 40 in this embodiment, includes a plurality of corner legs 42 for supporting the fuel assembly 10 on the lower core plate 14. A generally rectangular planar plate 46 is suitably attached, such as by welding, to the upper surface 44 of the support skirt 40. In the nozzle plate 46 of the debris filter bottom nozzle 12 of the present invention, a large number of small holes 48 are concentrated in the area of the flow holes through the lower core support plate 14 and are sized to filter out damaging size debris without adversely affecting flow or pressure drop through the bottom nozzle adapter plate 46 and across the fuel assembly 10. In this respect, the debris filter bottom nozzle 12 of this invention is very similar to that described in U.S. Pat. No. 4,900,507, assigned to the assignee of this invention. In the debris filter bottom nozzle 12 of the '507 patent, the flow holes 58 included inlet chamfers at each flow hole. In other respects, the flow holes 48 of the '507 patent were preferably uniform in cross-sectional size and defined a pattern which substantially covers every portion of the plate 46 across its length and breadth.

The diameter of the flow holes 48 does not allow passage of most of the debris that is of a size typically caught in the lowermost support grid 20. If the debris is small enough to pass through these plate flow holes 48, it will in most cases also pass through the grids 20 since the diameter of the flow holes 48 is small enough to catch most of the debris having a cross section larger than that of the unoccupied spaces through a cell of the support grid 20. Such unoccupied spaces are typically found in adjacent corners formed by the interleaved straps composing the grid 20 and are bounded by the corners, respective dimples and spring formed on the grip straps and the fuel rods 22, which extend through the grid cells. By insuring that most of the debris is small enough to pass through the grids unoccupied spaces, the debris filter bottom nozzle 12 of the present invention thereby significantly reduces the potential for debris-induced fuel rod failures. It should be appreciated that the improvement of this invention does not require that the narrowest cross section of the flow through holes 48 in the nozzle plate 46 be equal or smaller than the largest cross sectional dimension of the unoccupied spaces through a cell of the support grid 20, especially when the outlet of the flow through holes 48 effectively operate in conjunction with adjoining structures to further constrict the flow path. For example, when protective grids are employed, which typically are located approximately 0.025 to 0.125 inch (0.064 to 0.318 cm) above the nozzle plate 46, the grid straps further delimit the flow and trap debris in the area between the protective grid and the nozzle plate.

Based upon a comprehensive analysis of fuel surveillance underwater television photographs of fuel assemblies from reactors experiencing debris-induced fuel rod failures, a nominal diameter for the flow holes 48 of about 0.190 inch (0.48 cm) was selected, with 0.190+/−0.008 inch (0.48+/−0.02 cm) being preferred). It is possible for the holes 48 to be made somewhat smaller in diameter. All observed primary debris-induced fuel rod failures were at or below the lowermost grid and appear to be caused by debris somewhat larger than 0.190 inch (0.48 cm) in width. Other smaller debris typically present in the reactor coolant systems is believed to be relatively delicate in nature and not likely to cause rod damage since little or no significant damage can be observed above the lowermost grid. The evidence suggests that, heretofore, the damaging size debris is effectively stopped by the lowermost grid 20. The debris filter bottom nozzle 12, with approximately 0.190 inch (0.48 cm) diameter sized flow holes 48 defined in the bottom nozzle plate 46, is expected to reduce by 90% the potential rod damaging metallic debris carried into fuel assemblies by the primary coolant flow. Such estimate may be conservative since it appears likely that debris substantially larger than 0.190 inch (0.48 cm) in width may do a disproportionate amount of fuel rod damage.

Figure 3:
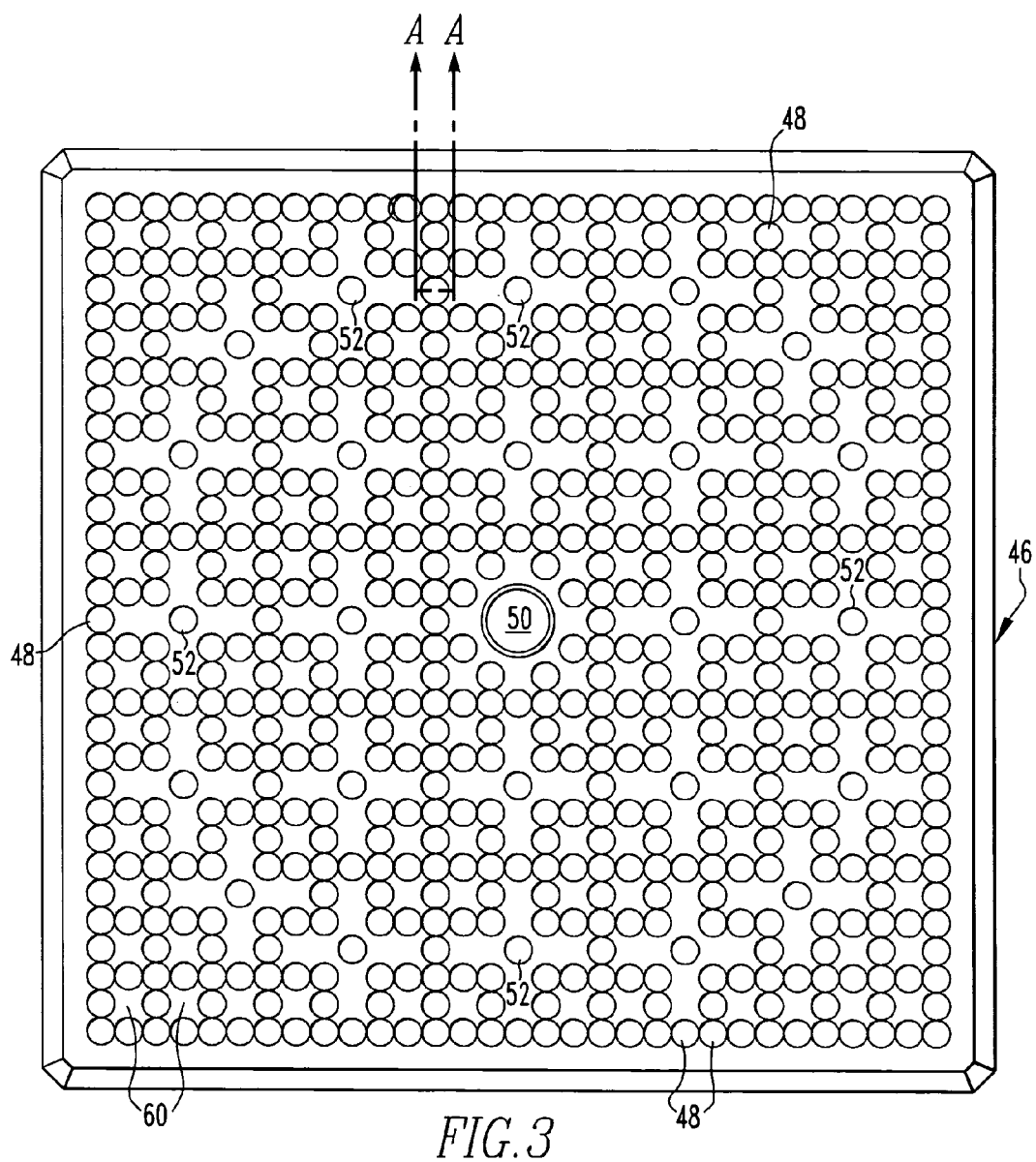
FIG. 3 is a top view of the bottom nozzle plate of this invention.

Referring to FIG. 3, it can be seen that, in addition to the large number of flow holes 48, the plate 46 includes one central instrumentation tube hole 50 and a number of guide thimble holes 52. The flow holes 48 described in the '507 patent included a long taper inlet chamfer, about 0.140 inch (0.36 cm) in length and forming an angle of approximately 15°+/−3° to the axis of the hole 48. The chamfer on the inlet was employed on each of the flow holes 48 to optimize the flow, i.e., minimize the loss coefficient increase due to the higher frictional affect inherent with the smaller flow holes 48. The longer chamfer 50 was thought to prevent the flow stream from reattaching within the adapter plate holes 48 and increasing pressure drop across the fuel assembly 10. Any increase in pressure drop across the fuel assembly, with the debris filter bottom nozzle 12 compared to an assembly with the conventional bottom nozzle, would be undesirable and very likely unacceptable. Although the debris filter bottom nozzle of the '507 patent provided smaller flow holes, the flow holes were more numerous than in the prior original bottom nozzle design. For the fuel assemblies to which it was adapted, the total flow area through the '507 patent debris filter bottom nozzle was not significantly reduced. However, the debris filter bottom nozzle flow area of the '507 patent design and the corresponding pressure drop have proven to be a limiting constraint for more advanced fuel designs.

Figure 4:
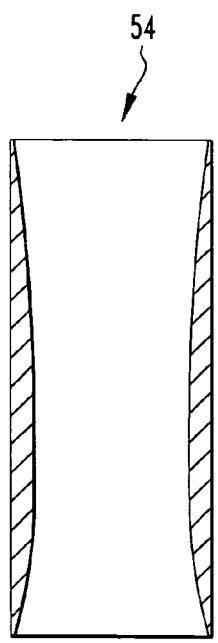
FIG. 4 is a side view of a cutaway section of FIG. 3 taken along the lines A-A thereof that shows a venturi flowthrough hole with curved inlet and outlet features.

The debris filter bottom nozzle was further improved by this invention by optimizing the coolant flow paths through the nozzle plate 46. The straight bore flow holes (with inlet chamfering) of the '507 patent debris filter bottom nozzle design were replaced by this invention with venturi flow holes, a cross section of which is shown in FIG. 4. The venturis 54 were constructed of relatively large-radii rounded inlets and outlets, either tangent or non-tangent to the bore. The venturi flow holes improved the nozzle 12 hydraulic performance, significantly reducing pressure drop. High pressure drop testing, extrapolated to reactor core flow conditions (500,000 Reynold's Number), has shown the improved debris filter bottom nozzle with venturi flow holes to reduce pressure drop and corresponding loss coefficient by approximately 53%. Furthermore, because the venturi constricted throat diameters are equivalent to the flow hole bores of the standard debris filter bottom nozzle of the '507 patent design, debris filtering was not compromised.

Figure 5:
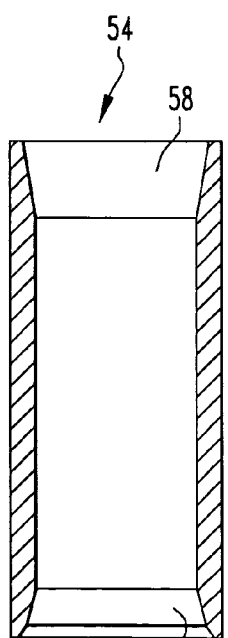
FIG. 5 is a side view of a cutaway section of FIG. 3 along the lines A-A thereof that shows a flowthrough hole with a double inlet chamfer and single outlet chamfer.

Past experience has shown pressure drop differences in nozzles made to identical drawings by different suppliers. In one case, the difference was traced to the manufacturing processes and differing deburr methods. One of the methods combined with an outlet chamfer in addition to the inlet chamfer could have provided a nozzle that delivered the pressure drop required for the advanced fuel designs currently under development. However, specification, control and inspection of this manual deburr process proved to be very difficult. The venturi flow through hole design 54 of the debris filter bottom nozzle 12 was enhanced, from a manufacturing point of view, by optimizing the coolant flow paths through the nozzle flow plate 46. The straight bore flow holes, with single inlet chamfering that was described in the '507 patent, was replaced with double chamfered inlet 56, i.e., two adjacent chamfers side by side one in front of the other, and a single outlet chamfer 58 to form the venturi 54 shown in FIG. 5. The angles of the chamfers were optimized to provide the lowest pressure drop. In effect, they approximate a curved surface and streamline the flow through the holes 48. Controlling and inspecting the curved geometry is difficult and expensive. The inventors hereof have found, through computational Fluid Dynamics and experimentation, that as little as two straight chamfers, if configured properly, could develop flow similar to the curved geometry and result in a similar reduced pressure drop, with less cost. The preferred chamfer design is shown in the following table where Chamfer A is the chamfer closest to the inlet, Chamfer B is the chamfer adjacent Chamfer A and Chamfer C is at the outlet of the flow through holes. The plate thickness is also shown. The nominal values define the intended dimensions. The minimum and maximum values take into consideration the tolerances and provide acceptable ranges for the chamfer lengths.

|  | Angle | Nominal Length (in.) | Maximum Length (in.) | Minimum Length (in.) |
| --- | --- | --- | --- | --- |
| Chamfer A | 35° ± 3° | 0.017 (0.043 cm) | 0.039 (0.099 cm) | 0.012 (0.030 cm) |
| Chamfer B | 15° ± 3° | 0.039 (0.099 cm) | 0.057 (0.145 cm) | 0.010 (0.025 cm) |
| Chamfer C | 10° ± 3° | 0.085 (0.361 cm) | 0.142 (0.361 cm) | 0.059 (1.397 cm) |
| Plate Thickness | — | 0.560 (1.422 cm) | 0.583 (1.481 cm) | 0.550 (1.397 cm) |

It should be appreciated that the specific dimensions set forth in the foregoing table, while providing the desired reduction in pressure drop, are meant to be illustrative and are not meant to limit the scope of the invention. Other values for the reduction in pressure drop can be achieved using different angles and dimensions. Preferably the dimensions are expressed as a ratio of the chamfer length divided by plate thickness L/T.

|  | Angle | Chamfer L/T Maximum | Chamfer L/T Minimum |
|---|---|---|---|
| Chamfer A | 2.33 × B | 0.071 | 0.020 |
| Chamfer B | 15° +/− 3° | 0.104 | 0.017 |
| Chamfer C | 0.67 × B | 0.258 | 0.101 |

Figure 6:
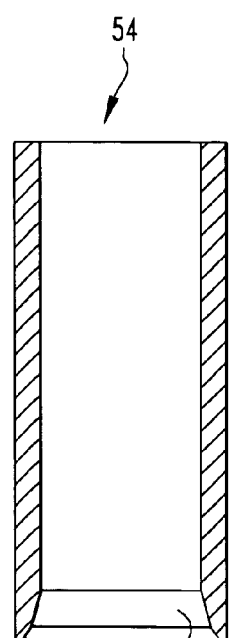
FIG. 6 is a side view of a cutaway section of FIG. 3 taken along the lines of A-A thereof that shows a flowthrough hole with a double inlet chamfer.

This new flowthrough hole design improved the nozzle hydraulic performance, significantly reducing pressure drop. High temperature pressure drop testing, extrapolated to reactor core flow conditions (500,000 Reynold's Number), has shown that the reduced pressure drop debris filter bottom nozzle of this invention, with these improved flow holes, reduced pressure drop and corresponding loss coefficient by 47% over that achieved by the '507 patent design. While the double chamfer design provides a slight increase in pressure drop over the smooth curved venturi design shown in FIG. 4, it provides a significant improvement in the manufacturability of the nozzle and a reduction in cost. Furthermore, because the new flow hole bore diameters at their most constricted point are equal to the flow hole bores of the '507 patent, debris filtering is not compromised. When manufacturability, inspectability and cost are considered, this design proves to provide consistent and reproducible pressure drop reduction. Where less of a reduction in pressure drop can be tolerated an additional reduction in manufacturing cost can be achieved by omitting the outlet chamfer as shown in FIG. 6. The embodiment illustrated in FIG. 6 is expected to yield a 20% reduction in pressure drop over that experienced with the '507 patent design.

One additional conventional function of the bottom nozzle plate 46 is to capture the fuel rods 22, that is, to prevent them from dropping through the bottom nozzle 12. At initial startup, the fuel rods 22 are held by the grids 20 above the bottom nozzle 12 as seen in FIG. 1. However, after the reactor is operated for a time, the grids 20 commonly loosen their grip on the fuel rods 22 and some drop down on the top of the bottom nozzle plate 46. As seen in FIG. 3, the fuel rods 22 are lined with the ligaments or sections 60 of the plate 46 between the flow holes 48. The flow holes 48 are packed in a density of approximately 16 per square inch. The sections 60 of the plate 46 extending between the flow holes 48 have a maximum dimension of 1/10 inch (0.25 cm). If the fuel rods 22, having maximum diameter of about 0.400 inch (1.02 cm), were located above the flow holes 48, then when falling down on the plate 46, they would plug up the holes and cause an increase in pressure drop. The lower end plugs 30 of the fuel rods 22, which rest on the sections 60 of the plate 46, have a terminal end diameter of approximately 0.150 inch (0.38 cm) and a tapered axial cross-sectional shape as seen in FIG. 1, which does not block the holes 48. However, if the terminal end of the lower end plug 30 was larger in diameter, then the section 60 of the plate 46 between the flow holes 48 would have to be larger in size in order to avoid the plug ends from covering portions of the adjacent holes 48. This would undoubtedly translate into fewer holes and an increase in pressure drop.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A fuel assembly for a pressurized water nuclear reactor including a plurality of elongated nuclear fuel rods having an extended axial length, at least a lowermost grid supporting said fuel rods in an organized array and having unoccupied spaces defined therein adapted to allow flow of fluid coolant therethrough and past said fuel rods when said fuel assembly is installed in the nuclear reactor and a plurality of guide thimbles extending along said fuel rods through and supporting said grid, a debris filter bottom nozzle disposed below said grid, below lower ends of said fuel rods, supporting said guide thimbles and adapted to allow flow of fluid coolant into said fuel assembly, said debris filter bottom nozzle comprising a substantially horizontal plate extending substantially transverse to the axis of the fuel rods and having an upper face directed toward said lowermost grid, said upper face of said plate having defined therethrough at least two different hole designs, the first hole design being a plurality of holes receiving lower ends of said guide thimbles where they are supported by said plate and the second hole design being a plurality of flow through holes extending completely through said plate for the passage of coolant fluid from a lower face of said plate to the upper face of said plate, each of said coolant flow through holes extending substantially in the axial direction of said fuel rods, in fluid communication with said unoccupied spaces, and in the extended direction at least some of said coolant flow through holes having a profile substantially of a venturi with flaring at both ends, wherein the flaring at the lower face of said plate comprises a series of a plurality of concentric countersinks of different included angles and depths into the coolant flow through hole.

2. The nuclear fuel assembly of claim 1 wherein said coolant flow through holes having a profile substantially of a venturi have an inlet end in the lower face of said plate and an outlet end in the upper face of said plate wherein the venturi is substantially formed by the concentric countersinks of different included angles and depths into the coolant flow through hole in said inlet and a chamfer in said outlet end.

3. The nuclear fuel assembly of claim 1 wherein the inlet chamfers approximates a curved surface.

4. The nuclear fuel assembly of claim 3 wherein the chamfers have the following dimensions and angles relative to a flow axis of the flow through hole where Chamfer A is the chamfer closest to the inlet, Chamfer B is the chamfer adjacent Chamfer A and Chamfer C is at the outlet of the flow through holes

|  | Angle | Nominal Length (in.) | Maximum Length (in.) | Minimum Length (in.) |
|---|---|---|---|---|
| Chamfer A | 35° ± 3° | 0.017 (0.043 cm) | 0.039 (0.099 cm) | 0.012 (0.030 cm) |
| Chamfer B | 15° ± 3° | 0.039 (0.099 cm) | 0.057 (0.145 cm) | 0.010 (0.025 cm) |
| Chamfer C | 10° ± 3° | 0.085 (0.361 cm) | 0.142 (0.361 cm) | 0.059 (1.397 cm). |

5. The nuclear fuel assembly of claim 3 wherein the chamfers have the following relative dimensions and angles with regard to a flow axis of the flow through hole where Chamfer A is the chamfer closest to the inlet, Chamfer B is the chamfer adjacent Chamfer A and Chamfer C is at the outlet of the flow through holes and L/T is the length of the chamfer divided by the thickness of the plate

|  | | Chamfer L/T | |
|---|---|---|---|
|  | Angle | Maximum | Minimum |
| Chamfer A | 2.33 × B | 0.071 | 0.020 |
| Chamfer B | 15° +/− 3° | 0.104 | 0.017 |
| Chamfer C | 0.67 × B | 0.258 | 0.101. |

6. The nuclear fuel assembly of claim 1 wherein substantially every coolant flow through hole not associated with a guide thimble has the venturi profile in the extended direction.

7. The nuclear fuel assembly of claim 1 including support means adapted to support said fuel assembly when installed in the nuclear reactor with said plate fixed at its periphery on said support means.

8. The nuclear fuel assembly of claim 1 wherein the coolant flow through holes have a substantially circular cross-section.

9. The nuclear fuel assembly of claim 8 wherein the coolant flow through holes have a 0.190+/−0.008 inch (0.48+/−0.02 cm) or less diameter at their narrowest cross-section.

10. The nuclear fuel assembly of claim 8 wherein the through coolant flow through holes are packed in a density of about 16 per square inch.

11. A debris filter bottom nozzle for a pressurized water nuclear reactor fuel assembly having a plurality of elongated nuclear fuel rods having an extended axial length, at least a lowermost grid supporting said fuel rods in an organized array and having unoccupied spaces defined therein adapted to allow flow of fluid coolant therethrough and past said fuel rods when said fuel assembly is installed in the nuclear reactor, a plurality of guide thimbles extending along said fuel rods through and supporting said grid, said debris filter bottom nozzle designed to be disposed below said grid, below lower ends of said fuel rods, to support said guide thimbles and adapted to allow flow of fluid coolant into said fuel assembly, said debris filter bottom nozzle comprising a substantially horizontal plate extending substantially transverse to the axis of the fuel rods and having an upper face to be directed toward said lowermost grid, said upper face of said plate having defined therethrough at least two different hole designs, the first hole design being a plurality of holes for receiving lower ends of said guide thimbles where they are to be supported by said plate and the second hole design being a plurality of flow through holes extending completely through said plate for the passage of coolant fluid from a lower face of said plate to the upper face of said plate, each of said coolant flow through holes when incorporated in said fuel assembly, extending substantially in the axial direction of said fuel rods, in fluid communication with said unoccupied spaces, and in the extended direction at least some of said coolant flow through holes having a profile substantially of a venturi with flaring at both ends, wherein the flaring at the lower face of said plate comprises a series of a plurality of straight, discrete, adjacent chamfers with each adjacent chamfer at a different angle than another adjacent chamfer relative to the axial direction of said fuel rods.

12. A fuel assembly for a pressurized water nuclear reactor including a plurality of elongated nuclear fuel rods having an extended axial length, at least a lowermost grid supporting said fuel rods in an organized array and having unoccupied spaces defined therein adapted to allow flow of fluid coolant therethrough and past said fuel rods when said fuel assembly is installed in the nuclear reactor, a plurality of guide thimbles extending along said fuel rods through and supporting said grid, a debris filter bottom nozzle disposed below said grid, below lower ends of said fuel rods, supporting said guide thimbles and adapted to allow flow of fluid coolant into said fuel assembly, said debris filter bottom nozzle comprising a substantially horizontal plate extending substantially transverse to the axis of the fuel rods and having an upper face directed toward said lowermost grid, said upper face of said plate having defined therethrough at least two different hole designs, the first hole design being a plurality of holes receiving lower ends of said guide thimbles where they are supported by said plate, the second hole design being a plurality of flow through holes extending completely through said plate for the passage of coolant fluid from a lower face of said plate to the upper face of said plate, each of said coolant flow through holes extending substantially in the axial direction of said fuel rods, in fluid communication with said unoccupied spaces, and at least some of said coolant flow through holes having a discrete, double chamfered inlet with each adjacent chamfer of the double chamfered inlet at a different angle than the other adjacent chamfer relative to the axial direction of said fuel rods.

13. The nuclear fuel assembly of claim 12 wherein the double chamfered inlet approximates a curved surface.

14. The nuclear fuel assembly of claim 12 wherein all of the coolant flow through holes not associated with a guide thimble include the double chamfered.

15. The nuclear fuel assembly of claim 12 wherein the chamfers have the following dimensions and angles relative to a flow axis of the flow through hole where Chamfer A is the chamfer closest to an inlet of the flow through hole and Chamfer B is the chamfer adjacent Chamfer A, spaced from the inlet

|  | Angle | Nominal Length (in.) | Maximum Length (in.) | Minimum Length (in.) |
|---|---|---|---|---|
| Chamfer A | 35° ± 3° | 0.017 (0.043 cm) | 0.039 (0.099 cm) | 0.012 (0.030 cm) |
| Chamfer B | 15° ± 3° | 0.039 (0.099 cm) | 0.057 (0.145 cm) | 0.010 (0.025 cm). |

16. The nuclear fuel assembly of claim 12 wherein the chamfers have the following relative dimensions and angles with regard to a flow axis of the flow through hole where Chamfer A is the chamfer closest to the inlet, Chamfer B is the chamfer adjacent Chamfer A and L/T is the length of the chamfer divided by the thickness of the plate

|  | | Chamfer L/T | |
|---|---|---|---|
|  | Angle | Maximum | Minimum |
| Chamfer A | 2.33 × B | 0.071 | 0.020 |
| Chamfer B | 15° +/− 3° | 0.104 | 0.017. |

* * * * *